United States Patent [19]

Toman et al.

[11] Patent Number: 5,270,416

[45] Date of Patent: Dec. 14, 1993

[54] THERMOSETTING GLYCIDYL MODIFIED ACRYLIC POWDER COATINGS

[75] Inventors: Perry A. Toman, Medina; Andrew M. Rohn, Clinton; Daniel Bode, Cleveland; Susan M. Miller, North Royalton, all of Ohio

[73] Assignee: Ferro Corporation, Cleveland, Ohio

[21] Appl. No.: 941,240

[22] Filed: Sep. 4, 1992

[51] Int. Cl.$^5$ ............................................. C08L 63/00
[52] U.S. Cl. ..................................... 526/773; 524/904
[58] Field of Search ........................... 526/273; 524/904

[56] References Cited

U.S. PATENT DOCUMENTS

| | | | |
|---|---|---|---|
| 4,089,910 | 5/1978 | Shibata et al. | 524/904 |
| 4,246,368 | 1/1981 | Murase | 524/904 |
| 4,256,805 | 3/1981 | Tugukuni et al. | 524/904 |

*Primary Examiner*—Paul R. Michl
*Assistant Examiner*—Edward Cain
*Attorney, Agent, or Firm*—Rankin, Hudak & Hill

[57] ABSTRACT

Thermosetting powder coating compositions are produced based on a low molecular weight glycidyl functional copolymer produced by solvent polymerization of ethylenic monomers in an organic solvent polymerization medium containing at least 15% by weight organic solvent based on the weight of solvent and monomers copolymerized, where the ethylenic monomers copolymerized comprise on a weight basis between about 15% and 35% glycidyl methacrylate, between about 5% and 60% methyl methacrylate, between about 2% and 15% butyl methacrylate, and between about 5% and 50% styrene, to produce glycidyl functional copolymer having a melt viscosity between 150 and 400 poise and a Tg between 80° C. and 100° C., where the copolymer is coreactive with carboxyl functional crosslinking compounds.

13 Claims, No Drawings

THERMOSETTING GLYCIDYL MODIFIED ACRYLIC POWDER COATINGS

This invention pertains to paint coatings generally and particularly to clear and pigmented powder paint coatings based on a thermosetting polymeric binder comprising a glycidyl methacrylate modified functionally reactive acrylic copolymer having a high glass transition temperature (Tg) in conjunction with low molecular weight and particularly exhibiting good storage stability and improved film appearance.

BACKGROUND OF THE INVENTION

This invention pertains generally to protective, surface coatings commonly known as paint coatings. Protective surface coatings are organic compositions applied to substrates, to form continuous films which are cured or otherwise hardened to provide protection as well as a decorative appearance to the substrates. Protective surface coatings ordinarily comprise an organic polymeric binder, pigments, inert fillers and other, paint coating additives. The polymeric binder functions as an organic vehicle for the pigments, inerts, and other additives and further functions as a binder for the pigments ana inert fillers in the cured or hardened paint film. Polymeric binders can be thermosetting binders based on coreactive binder components.

Powder coatings are organic coatings in dry powder form comprising essentially 100% non-volatile solids and based on a polymeric film forming binder. Powder coatings can be clear coatings without opacifying pigments or pigmented coatings containing opacifying pigments. Powder paints are finely pulverized polymeric compositions in the form of dry free-flowing fine powder which melts and flows at elevated temperatures to produce a smooth coated surface when applied to a substrate. Protective surface coatings based on powder paints are particularly useful in view of environmental compliance in that powder paints ordinarily do not contain organic solvents or emit organic compounds upon baking or heat curing.

Thermosetting acrylic polymer based powder coatings exhibit good exterior durability as well as detergent and alkali resistance. Functionally reactive acrylic copolymers can be cured or cross-linked with crosslinkers such as aliphatic diacids to obtain good film appearance. Acrylic powder coatings exhibit good surface hardness and scratch resistance but generally are less flexible than polyester powder coatings. To achieve a good film appearance with acrylic powder coatings, the melt viscosity of the acrylic copolymer binder must be low which can be obtained by reducing the molecular weight or the glass transition temperature (Tg) of the acrylic copolymer. However, reducing one physical characteristic ordinarily adversely affects physical properties and particularly storage stability where powder paints tend toil fuse upon standing. It now has been found that thermosetting acrylic powder paint compositions comprising certain glycidyl methacrylate copolymers processed in accordance with this invention provide an acrylic copolymer binder having a low molecular weight in combination with a high Tg.

The use of glycidyl functional acrylic copolymers in a liquid paint system is described in U.S. Pat. No. 2,857,354. In respect to powder coatings, U.S. Pat. No. 3,781,380, U.S. Pat. No. 3,730,930, U.S. Pat. No. 3,752,870, and U.S. Pat. No. 4,091,049 disclose the use of glycidyl acrylics in powder coatings based on relatively high molecular weight copolymers. Other patents which suggest glycidyl acrylic copolymers for powder paints include U.S. Pat. No. 3,787,520, U.S. Pat. No. 3,787,521, U.S. Pat. No. 3,876,587, U.S. Pat. No. 3,939,127, U.S. Pat. No. 3,932,367, U.S. Pat. No. 4,027,066, U.S. Pat. No. 4,042,645, U.S. Pat. No. 4,346,144 and U.S. Pat. No. 4,234,466.

It now has been found that a low molecular weight glycidyl methacrylate copolymer with a high Tg can produce an excellent cured paint film appearance by controlling the methacrylate copolymer composition within a narrow range of copolymrized ethylenic monomers, primarily methacrylate monomers, in conjunction with certain process steps for copolymerizing the monomers. Achieving an attractive cured film appearance with high Tg copolymer necessary for powder is surprising because high Tg copolymers ordinarily produce inferior cured coating surfaces exhibiting non-smooth textured surfaces known as orange peel. The resulting glycidyl methacrylate copolymer has a number average molecular weight below about 2500, a calculated Tg above about 80° C., and a melt viscosity between about 150 and 400 poise. The copolymer is particularly useful as a polymeric binder in powder coatings and imparts good physical storage stability and good paint film appearance. The melt viscosity is low even though the Tg is high. The glycidyl functional copolymers are functionally reactive and coreact with carboxyl functional crosslinkers to provide thermosetting powder coatings. These and other advantages of this invention will become more apparent by referring to the detailed description of the invention and the illustrative examples.

SUMMARY OF THE INVENTION

Briefly, the powder paint coating of this invention is based on a glycidyl methacrylate copolymer comprising on a weight basis copolymerization of the following ethylenically unsaturated monomers:
between 15% and 35% glycidyl methacrylate,
between 5% and 60% methyl methacrylate,
between 2% and 15% butyl methacrylate,
between 5% and 50% styrene, and
between 0% and 7% other ethylenically unsaturated monomers other than styrene and the methacrylate monomers listed immediately above.

The process of this invention comprises a non-aqueous organic solvent copolymerization of the foregoing identified monomers in an organic solvent polymerization medium where between about 15% and 50% organic solvent is used based on the weight of monomers and organic solvent. The monomers are copolymerized at temperatures between about 120° C. and 165° C. for time sufficient to produce a copolymer having a number average molecular weight below about 2500, a melt viscosity between about 150 and 400 poise, and a calculated Tg between about 80° C. and 100° C.

DETAILED DESCRIPTION OF THE INVENTION

The powder paint of this invention is based on a thermosetting polymeric binder comprising a non-aqueous addition copolymer of copolymerized ethylenically unsaturated monomers comprising glycidyl methacrylate copolymerized with certain other ethylenically unsaturated monomers, where the glycidyl functional copolymer is coreactive with functionally reactive carboxyl crosslinkers to form thermosetting powder paint. The glycidyl methacrylate monomer is particularly copolymerized with major amounts of other methacrylate monomers consisting of methyl methacrylate and butyl methacrylate along with styrene. On a total weight basis of monomers copolymerized, the glycidyl functional methacrylic copolymer consists of copolymerized ethylenically unsaturated monomers comprising:

between 15% and 35% glycidyl methacrylate,
between 5% and 60% methyl methacrylate,
between 2% and 15% butyl methacrylate,
between 5% and 50% styrene, and
between 0% and 7% other ethylenically unsaturated monomer other than styrene and the methacrylate monomers listed immediately above. Preferred copolymer compositions comprise between about 20% and 25% glycidyl methacrylate, between about 25% and 50% and most preferably between 30% and 40% methyl methacrylate, between 15% and 30% styrene, and between 0% and 5% and preferably about 0% other ethylenically unsaturated monomer, In respect to the butyl methacrylate monomers, iso-butyl methacrylate is preferred at levels between about 5% and 15% while n-butyl methacrylate can be used at levels between about 2% and 15% and preferably between 3% and 7%.

In respect to other ethylenically unsaturated monomers, minor amounts between 0% and 7% and preferably between 0% and 5% of such other monomer can be included and copolymerized with the major monomers, but preferably are not included. Minor amounts of other methacrylate monomers can be included, if desired, and may include low alkyl methacrylates such as ethyl methacrylate, butyl methacrylate, propyl methacrylate, 2-ethyl hexyl methacrylate and similar low aliphatic methacrylates, as well as hydroxy alkyl methacrylates such as 2-hydroxy ethyl methacrylate and 2-hydroxypropyl methacrylate. If desired, minor amounts of other ethylenically unsaturated monomers other than methacrylates can be copolymerized with the major monomers. Useful other ethylenic monomers include acrylic monomers such as methyl acrylate, ethyl acrylate, butyl acrylate, propyl acrylate, cyclohexyl acrylate, and similar lower aliphatic acrylates having up to six carbon atoms as well as hydroxy containing ethylenically unsaturated monomers including hydroxy alkyl acrylates such as 2-hydroxy ethyl acrylate, 2-hydroxypropyl acrylate, and similar hydroxy alkyl acrylates. Other useful ethylenically unsaturated monomers can include vinyl monomers including vinyl aromatic hydrocarbons such as alkyl styrenes, chlorostyrene, vinyl toluene, and divinyl benzene.

The glycidyl methacrylate copolymer preferably has a softening point (Tg) calculated by the Fox equation and within the range between about 80° C. and 100° C. Tg is calculated by the Fox equation based on the Tg and weight percent of individual monomers copolymerized. The Fox equation is: $1/Tg = \Sigma Wi/Ti$. The copolymer has a number average molecular weight below about 2500° C. measured by high performance gel permeation chromatography (HPGPC) which is a GPC method particularly useful for measuring low molecular weight polymers. GPC is measured according to ASTM D3536-76, D3593-80, or D3016-78. The melt viscosity of the copolymer is between about 150 and 400 poise and preferably between about 170 and 300 poise. Clear unpigmented powder paint containing the copolymer as a binder has a melt viscosity between 150 and 350 poise and preferably between 170 and 250 poise, while pigmented powder paint has a melt viscosity between 150 and 400 poise and preferably between 200 and 300 poise.

The glycidyl functional acrylic polymer is produced by a non-aqueous addition polymerization of ethylenically unsaturated monomers in an organic solvent polymerization medium where the monomers are activated by peroxide or azo or other free radical initiator at polymerization temperatures typically between 120° C. to 165° C. and preferably between 140° C. to 150° C. Organic solvent comprises between 15% and 50% and preferably between 20% and 25% based on the weight of the total monomer and organic solvent. Useful organic solvents include for example xylene, methyl amyl ketone and toluene. Copolymerization initiators are used at high levels above 3% and preferably between 4% and 6% initiator based on the weight of the monomers copolymerized. Useful polymerization initiators can include for instance, benzoyl peroxide, t-butyl hydroperoxide, tertiary butyl perbenzoate, cumene peroxide and similar peroxide polymerization initiators and azo initiators such as azo bisisobutyronitrile and dimethylazobis-isobutyrate.

The glycidyl functional methacrylic copolymer can be crosslinked with about 8% to 30% carboxyl functional crosslinker based on the weight of crosslinker and coreactive copolymer. Preferred crosslinkers comprise a dicarboxylic acid component such as aliphatic dicarboxylic acids having between 9 and 20 carbon atoms. Suitable aliphatic dicarboxylic acids include for instance dodecane dioic acid (dodecyl dicarboxylic acid) and sebacic acid. The preferred dicarboxylic acid is dodecane dioic acid and the preferred level of dicarboxylic acid crosslinker is between 9% and 25%. Suitable crosslinkers further include low molecular weight carboxylic acid functional polyesters which can be utilized at levels between about 10% and 30%. Useful polyesters comprise a low molecular weight linear polyester polymer having a number average molecular weight between about 250 and 1000 preferably between 250 and 500, while the Acid No. should be above about 150 and preferable between 250 and 400. Suitable low molecular weight polyesters comprise the esterification product of a glycol with dicarboxylic acid, where linear aliphatic glycols esterified with lesser equivalents of a linear saturated dicarboxylic acid having between 2 and 12 linear carbon atoms such as adipic, azelaic, succinic, glutaric, pimelic, suberic or sebacic acid. Preferred and commercially available linear saturated dicarboxylic acids are adipic or azelaic acid. Minor amounts of aromatic dicarboxylic acids (anhydrides) such as phthalic, isophthalic, terephthalic, and tetrahydrophthalic can be included, if desired, within molecular weight range. Suitable glycols include non-ether linear aliphatic glycols having 2 to 8 carbon atoms such as 1,3 or 1,4 butylene glycol, 1,6 hexane diol, neopentyl glycol, propylene glycol and similar linear glycols or ether glycols such as diethylene glycol and dipropylene glycol and bisphenol ethers. The preferred glycol is ethylene glycol.

The polyester can be produced by solvent or bulk polymerization although bulk polymerization is preferred. The raw materials can be charged in bulk and esterification polymerized at temperatures typically between 190° C. to 240° C. although moderately higher or lower temperatures can be utilized satisfactorily. An esterification catalyst can be used, typically at less than 1% levels based on charge, such as an organo tin compound. Preferred polyesters are crystalline polyesters having a melting point above about 70° C., preferably above about 80° C., but below the curing temperature required for crosslinking the coating.

Dry powder paints can be produced as unpigmented clear powders or pigmented powders. The polymeric binder comprising glycidyl methacrylic copolymer and dicarboxylic acid crosslinker resins can be blended together with other paint additives including filler and colorant pigments if desired. The resinous binder can be thoroughly and uniformly mixed with raw batch ingredients by homogenizing the binders, pigmentary solids, plasticizers and other components to uniformly blend the resinous binder with the pigmentary solids. Powder paint can contain additives such as U.V. absorbers, light stabilizers and flow control additives. Pigments can ordinarily include opacifying pigments such as titanium dioxide, zinc oxide, leaded zinc oxide, as well as tinting pigment such as carbon black, yellow oxides, brown oxides, tan oxides, raw and burnt sienna or umber, chromium oxide green,, phthalocyanine green, phthalonitrile blue, ultramarine blue, cadmium pigments, chromium pigments, and the like. Filler pigments such as clay silica, talc, mica, wollastonite, wood flower and the like can be added. The raw batch ingredients can be thoroughly mixed in a high intensity mixer such as a frustroconical agitator whereby the materials are discharged in a uniform mixture. The high intensity mixer discharges the batch components to a heated screw extruder wherein the extruder is internally heated by an indirect heating fluid such as steam, hot water, or synthetic oil whereupon the exit extruder temperature is regulated according to the type of powder paint being produced but generally is between about 40° C. and 150° C. at the heated exit die of the screw fed extruder. The extrudate emerges from the extruder as a ribbon of less than about 1/16 inch thickness which passes onto a water cooled stainless steel conveyor belt whereby the plastic ribbon extrudate fully hardens. The cooled extrudate then passes through a mechanical commuter disposed at the end of the cooled stainless steel belt to efficiently break the fragile brittle ribbon into very small flakes. The small flakes are then discharged onto a cooled mill, such as a hammer mill, to grind the small particles into powder paint preferably passing a 140 mesh U.S. Standard sieve screen whereupon the powder can be further classified into particle size if desired.

The thermoset coating compositions are prepared by melt mixing the ingredients of the coating which can be accomplished by dry blending in a Wellex mixer, followed by melt mixing in an extruder at a temperature of 30° C. to 130° C. The extrudate is cooled and ground into a fine powder. The powder coating is then applied to a metal substrate by electrostatic spray or fluidized bed. Upon application of the powder, the coated substrate is baked at a temperature of 275°-350° F. (120° C. to 175° C.) for 20 to 45 minutes. These powder coatings have good physical and chemical stability and, when cured, give films with good appearance, with good physical properties.

The present invention will be more fully understood, by referring to the following illustrative examples.

EXAMPLES

Processing. In the following examples, high Tg low molecular weight glycidyl methacrylate resins were generally prepared in accordance with the following procedure. Xylene solvent was charged to a reactor fitted with a reflux condenser, agitator and heated to about 145° C. The ethylenic monomers and azo initiator were premixed and added to the reaction vessel over a period of about 4 hours at an average polymerization temperature during the monomer addition of about 145° C. After all the monomer was added, the batch temperature was held at 145° C. for about 45 minutes. Deionized water was added and the solvent/water azeotrope was collected while the batch temperature was maintained at about 145° C.-160° C. After all the water was added, a full vacuum was applied to the batch for ½ hour, whereupon the resulting resin was cooled and stored.

Tack Temperature. The tack temperature of a resin is the temperature at which a powdered sample sticks to a differentially heated bar. The tack temperature is related to the glass transition temperature (Tg) which is defined as the temperature at which the polymer changes from the glassy to the soft or rubbery state. The tack temperature is measured as follows. The powder is applied to a 34×1×1 aluminum bar which is heated at one end. The material is allowed to stay on the bar for one minute, then removed using a nylon paint brush. The point on the bar at which the powder begins to stick is measured using a surface temperature probe and is reported as the powder tack temperature.

Melt Viscosity. Melt viscosity was measured by place 0.2 grams of the powdered sample on an ICI cone and plate viscometer (model VR-4752) set at 150° C. The material was allowed to melt and the viscosity measured after one minute.

Powder Stability. Powder stability was tested by the following method. A 2 oz. glass jar was half filled with ground powder. The container was capped and placed in a water batch maintained at 40° C. (for pigmented coatings) or 33° C. (for unpigmented coatings). Flow characteristics for the powder was rated according to the following scale:

| | |
|---|---|
| 9 | Free flowing |
| 8 | Free flowing after agitation |
| 7 | Small agglomerates (2-5 mm) |
| 6 | Small to medium agglomerates |
| 5 | Medium agglomerates (10-15 mm) |
| 4 | Medium to large agglomerates |
| 3 | Large agglomerates (20 mm) |
| 2 | Solid but breaks after agitation |
| 1 | Solidly sintered |

Molecular Weight. Molecular weights were measured by high performance gel permeation chromatography (HPGPC).

EXAMPLES 1-6

The process for synthesizing solid methacrylic resins, A through F used in producing paints in Examples 1-6 was generally as follows. Solvent was charged to a reactor fitted with a reflux condenser, agitator and thermocouple and heated to 142° C. The ethylenic monomers were added to the reaction vessel over a period of 4 hours. After all the monomer had been added, the batch temperature was held at 145° C. for about 45 minutes. Deionized water was added and the solvent/water azeotrope was collected. The batch temperature was maintained at 145° C.-160° C. After the addition of water, a full vacuum was applied to the batch for ½ hour, whereupon the resulting resin was cooled and stored. The compositions and measured physical constants of the respective acrylic resins are listed in Tables 1, 4 and 7.

TABLE 1

| Resin | A | B | C | D | E | F |
|---|---|---|---|---|---|---|
| o-xylene | 1250 | 1250 | 1250 | 1250 | 1250 | 1625 |
| Styrene | 1500 | 2500 | 2500 | 1500 | 2500 | 1950 |
| Methyl Methacrylate | 1800 | 850 | 1000 | 1850 | 800 | 2600 |
| iso-butyl methacrylate | 450 | 650 | 975 | 650 | 450 | 975 |
| glycidyl methacrylate | 1250 | 1000 | 975 | 1000 | 1250 | 975 |
| t-butyl perbenzoate | 250 | 250 | 250 | 250 | 250 | 325 |
| Viscosity (150° C.) | 243 | 220 | 230 | 212 | 323 | 150 |
| Tack Temp. (°F.) | 180 | 183 | 183 | 177 | 189 | 172 |
| Non-volatile (%) | 98.9 | 98.6 | 99.0 | 98.9 | 98.9 | 98.7 |
| Calculated Tg (°C.) | 90 | 90 | 90 | 90 | 90 | 90 |
| No. avg. mol. wt. | 2380 | 3340 | 3330 | 2510 | 3350 | 2350 |
| Wt. avg. mol. wt. | 6080 | 7760 | 7720 | 5980 | 7650 | 5570 |

TABLE 2

| Example Paint No. | 1 | 2 | 3 | 4 | 5 | 6 |
|---|---|---|---|---|---|---|
| Solid copolymer (a) | 1133.4 | | | | | |
| Solid copolymer (b) | | 1215.2 | | | | |
| Solid copolymer (c) | | | 1173.0 | | | |
| Solid copolymer (d) | | | | 1173.0 | | |
| Solid copolymer (e) | | | | | 1215.2 | |
| Solid copolymer (f) | | | | | | 1215.2 |
| dodecanedioic acid | 148.7 | 148.7 | 190.9 | 190.9 | 230.5 | 148.7 |
| Titanium dioxide | 102.5 | 102.5 | 102.5 | 102.5 | 102.5 | 102.5 |
| Flow agent | 15.3 | 15.3 | 15.3 | 15.3 | 15.3 | 15.3 |
| Benzoin | 13.7 | 13.7 | 13.7 | 13.7 | 13.7 | 13.7 |
| Carbon Black | 4.6 | 4.6 | 4.6 | 4.6 | 4.6 | 4.6 |

TABLE 3

| Example Paint No. | Stability (1 day) | Tack Temp. (°F.) | Film Texture |
|---|---|---|---|
| 1 | 7 | 162 | slight |
| 2 | 8-8.5 | 164 | slight/moderate |
| 3 | 8-8.5 | 164 | slight |
| 4 | 7.5-8 | 161 | slight/moderate |
| 5 | 8 | 164 | moderate |
| 6 | 5.5 | 157 | very slight |

TABLE 4

| Resin | A | G | H | I |
|---|---|---|---|---|
| o-Xylene | 1250 | 625 | 625 | 625 |
| Styrene | 1500 | 750 | 750 | 750 |
| Methyl Methacrylate | 1800 | 638 | 403 | 162.5 |
| iso-Butyl Methacrylate | 450 | 487 | 721.5 | 962.5 |
| Glycidyl Methacrylate | 1250 | 625 | 625 | 625 |
| t-Butyl Perbenzoate | 250 | 93.8 | 75 | 68.8 |
| Viscosity (150° C.) | 243 | 238 | 190 | 158 |
| Tack Temperature (°F.) | 180 | 178 | 172 | 166 |
| Non-Volatile (%) | 98.9 | 98.9 | 98.9 | 98.9 |
| Calculated Tg (°C.) | 90 | 85 | 80 | 75 |
| Tg (°C., from DSC) | 48 | 45 | 42 | 39 |
| Number average molecular wt. | 2380 | 2240 | 2750 | 2870 |
| Weight average molecular wt. | 6080 | 6640 | 7370 | 7800 |

TABLE 5

| Example Paint No. | 7 | 8 | 9 |
|---|---|---|---|
| Solid Copolymer (G) | 1137.6 | | |
| Solid Copolymer (H) | | 1137.6 | |
| Solid Copolymer (I) | | | 1137.6 |
| Dodecanedioic acid | 241.6 | 241.6 | 241.6 |
| Titanium Dioxide | 96.5 | 96.5 | 96.5 |
| Flow Agent | 15.4 | 15.4 | 15.4 |
| Benzoin | 13.8 | 13.8 | 13.8 |
| Carbon Black | 5.5 | 5.5 | 5.5 |

TABLE 6

| Example Paint No. | Stability (1 day) | Tack Temp. (°F.) | Film Texture |
|---|---|---|---|
| 1 | 7 | 162 | slight |
| 7 | 4 | 163 | slight |
| 8 | 1-1.5 | 158 | slight |
| 9 | 1 | 152 | slight |

TABLE 7

| Resin | J | K | L |
|---|---|---|---|
| Xylene | 600 | 600 | 600 |
| Styrene | 720 | 720 | 720 |
| Methyl Methacrylate | 864 | 288 | 288 |
| iso-Butyl Methacrylate | 216 | 792 | 648 |
| Butyl Acrylate | | | 144 |
| Glycidyl Methacrylate | 600 | 600 | 600 |
| Vazo-67 | 144 | 127.2 | 91.2 |
| Viscosity (150° C.) | 202 | 175 | 185 |
| Tack Temperature (°F.) | 180 | 170 | 167 |
| Non-volatile (%) | 99.0 | 98.6 | 98.7 |
| Calculated Tg (°C.) | 90 | 78 | 67 |
| Number average molecular wt. | | 2720 | 3390 |
| Weight average molecular wt. | | 6380 | 8340 |

TABLE 8

| Example Paint No. | 10 | 11 | 12 |
|---|---|---|---|
| Solid Copolymer (J) | 1120.8 | | |
| Solid Copolymer (K) | | 1120.8 | |
| Solid Copolymer (L) | | | 1120.8 |
| Polyester crosslinker | 268.1 | 268.1 | 268.1 |
| Benzoin | 6.9 | 6.9 | 6.9 |

TABLE 9

| Example Paint No. | Stability (1 day) | Stability (4 days) | Tack Temp. (°F.) | Film Texture |
|---|---|---|---|---|
| 10 | 8.5 | 8 | 142 | slight |
| 11 | 7 | 4 | 140 | slight |
| 12 | 5 | 3 | 139 | slight |

Although preferred embodiments of the invention have been described and illustrated by the examples, the scope of the invention is not intended to be limited, except by the appended claims.

We claim:

1. A thermosetting powder coating composition containing a low molecular weight glycidyl functional copolymer binder consisting of copolymerized ethylenically unsaturated monomers copolymerized in organic solvent, the binder copolymer comprising said monomers copolymerized on a weight basis as follows:
between about 15% and 35% glycidyl methacrylate, between about 5% and 60% methyl methacrylate,
between about 2% and 15% butyl methacrylate, and
between about 5% and 50% styrene, where said monomers are copolymerized at a temperature between about 120° C. and 165° C. in the presence of at least 3% polymerization initiator based on the weight of monomers copolymerized to produce a glycidyl functional copolymer binder having a melt viscosity between about 150 and 400 poise, a Tg between about 80° C. and 100° C. as calculated by the Fox equation, and a number average molecular weight below 2500; and said coating composition containing by weight between about 8% and 30% carboxyl functional crosslinker adapted to crosslink with the glycidyl functional copolymer.

2. The powder coating composition of claim 1 where the binder copolymer comprises copolymerized monomers on a weight basis:
between 20% and 25% glycidyl methacrylate,
between 25% and 50% methyl methacrylate,
between 2% and 15% butyl methacrylate, and
between 17% and 30% styrene,
where the binder copolymer has a number average molecular weight below 2500 and a melt viscosity between about 170 poise and 300 poise.

3. The powder coating of claim 2 where the glycidyl copolymer has a Tg between about 85° C. and 90° C.

4. The powder coating composition of claim 2 where the butyl methacrylate is iso-butyl methacrylate and comprises between about 5% and 15% of the weight of said monomers copolymerized.

5. The powder coating composition of claim 4 where the iso-butyl methacrylate comprises between 7% and 12% of the weight of monomers copolymerized.

6. The powder paint coating composition of claim 2 where the butyl methacrylate is n-butyl methacrylate and comprises between 3% and 7% of said monomers copolymerized.

7. A process for producing a thermosetting powder pain containing a low molecular weight polymeric binder copolymer of copolymerized ethylenically unsaturated monomers, the process step comprising:
copolymerizing in an organic solvent polymerization medium said monomers comprising on a weight basis,
between about 15% and 35% glycidyl methacrylate,
between about 5% and 60% methyl methacrylate,
between about 2% and 15% butyl methacrylate, and
between about 5% and 50% styrene,
where the organic solvent comprises between about 15% and 50% by weight of the total of said solvent and said monomers, said monomers copolymerized at a temperature between about 120° C. and 165° C. in the presence of at least 3% polymerization initiator based on the weight of monomers copolymerized to produce a glycidyl functional copolymer binder having a melt viscosity between about 150 and 400 poise, a number average molecular weight below 2500, and a calculated Tg between about 80° C. and 100° C.; and said glycidyl functional copolymer mixed with a carboxyl functional crosslinker to provide a thermosetting powder coating composition.

8. The process according to claim 7, where the solvent polymerization medium comprises by weight between about 20% and 25% of the said solvent and said monomers copolymerized.

9. The process according to claim 8 where the monomers are copolymerized at temperatures between about 140° C. and 150° C.

10. The process according to claim 7 where the monomers are copolymerized in the presence of about 4% to 6% initiator, the monomers comprising on a weight basis:
between about 20% and 25% glycidyl methacrylate,
between about 25% and 50% methyl methacrylate,
between about 2% and 15% butyl methacrylate, and
between about 17% and 30% styrene,
to produce a glycidyl copolymer having a number average molecular weight below 2500 and a melt viscosity between about 170 poise and 300 poise.

11. The process of claim 10 where the butyl methacrylate is iso-butyl methacrylate and comprises between about 5% and 15% of the weight of said monomers copolymerized.

12. The process of claim 10 where the butyl methacrylate is iso-butyl methacrylate and comprises between about 7% and 12% by weight of the monomers copolymerized.

13. The process of claim 10 where the butyl methacrylate is n-butyl methacrylate and comprises between 3% and 7% of said monomers copolymerized.

* * * * *